*Inventors*
*Alan Mathison Turing,*
*Donald Watts Davies and*
*Michael Woodger*
*By* *Stevens, Davis, Miller & Mosher*
*Attorneys*

July 16, 1957 A. M. TURING ET AL 2,799,449

DATA STORAGE TRANSFER MEANS FOR A DIGITAL COMPUTER

Filed April 23, 1951 4 Sheets-Sheet 2

INVENTORS

Alan Mathison Turing,
Donald Watts Davies
and Michael Woodger

BY

Stevens, Davis, Miller & Mosher

ATTORNEYS

July 16, 1957 A. M. TURING ET AL 2,799,449

DATA STORAGE TRANSFER MEANS FOR A DIGITAL COMPUTER

Filed April 23, 1951 4 Sheets-Sheet 3

*Inventors*
*Alan Mathison Turing,*
*Donald Watts Davies and*
*Michael Woodger*

*By* *Stevens, Davis, Miller and Mosher*
Attorneys

DATA STORAGE TRANSFER MEANS FOR A DIGITAL COMPUTER

Filed April 23, 1951 4 Sheets-Sheet 4

*Inventors*
*Alan Mathison Turing,*
*Donald Watts Davies and*
*Michael Woodger*
*By Stevens, Davis, Miller and Mosher*
*Attorneys*

2,799,449
Patented July 16, 1957

2,799,449

DATA STORAGE TRANSFER MEANS FOR A DIGITAL COMPUTER

Alan Mathison Turing, Wilmslow, Donald Watts Davies, Southsea, and Michael Woodger, Ashtead, England, assignors to National Research Development Corporation, London, England Application April 23, 1951, Serial No. 222,366

Claims priority, application Great Britain May 4, 1950

5 Claims. (Cl. 235—61)

This invention relates to electrical digital computing engines which employ stores in which stored words (numbers and instructions) are incident at the output terminals of the stores sequentially so that if a particular word, or sequence of words, is to be read out the instants of opening and closing gates connected to the output terminals must be exactly defined by the circuit controlling the transfer of the word, or sequence of words, read out.

A convenient form of such a storage device is the well-known acoustic delay line which consists essentially of a straight cylindrical tube filled with mercury and with a piezo-electric crystal at each end. If an electrical pulse is applied to the crystal at one end of the line an ultrasonic wave travels down the line at the velocity of sound in mercury and at the other end is reconverted into an electrical pulse by the other crystal. This new pulse may be amplified, reshaped and fed back to the input crystal and in this way the pulse or a whole pattern of pulses may be preserved indefinitely.

Another example of such a storage device is the magnetic recording store in which parts of a moving ferro-magnetic member are magnetised to record digits representing numbers in the binary scale of notation. Magnetic stores of this kind are described, for example, in the specifications of co-pending applications Serial Nos. 146,445, now Patent No. 2,652,554, granted September 15, 1953, 146,446, now Patent No. 2,734,186, 195,042, now Patent No. 2,700,555 and 196,776, now Patent No. 2,694,192.

In digital computing engines calculations are made by transferring words from one part of the machine to another and it will be appreciated that with a storage device of the kind described above the words are continuously circulating in the store and the transfers have to be carefully timed in order to transfer the right word or words. The present invention is concerned with methods of transferring words from one part of a computing engine to another part and to apparatus for effecting such methods. The invention is particularly concerned with the timing of such transfers.

The invention does not, of course, apply to the transfer of information from a store in which any word can be read out at any time, such a store is the well-known Williams' tube.

The terms used in this specification and the symbols used in the accompanying drawings are well-known to those skilled in this art and are defined and explained in the specification of co-pending application Serial No. 202,615, now Patent No. 2,686,632, granted August 17, 1954.

The present invention will be more readily understood if a concrete example is considered. Consider, therefore, a computing engine working with a major cycle of 32 minor cycles each of which comprises 40 digits, suppose such a machine has 256 possible sources of words to be transferred of which 32 are possible instruction sources, 256 possible destinations for words to be transferred and 16 possible circuits through which words have to pass during the transfer and in which arithmetical or logical operations are performed on the words. These circuits will be referred to hereinafter as function boxes. Further suppose that such an engine has to operate with instruction words of the following kind:

"Transfer words from source *a* and source *b* through function box *c* to destination *d* and take the next instruction from source *e*."

In the engine specified the instruction word will require 8 binary digits to define each of *a*, *b* and *d*, 4 binary digits to define *c* and 5 binary digits can define *e*; that is to say 33 binary digits in all. This leaves only 7 binary digits to define the timing of the transfer since each instruction word comprises altogether 40 digits.

Now it has previously been proposed to time transfers by specifying the first and last minor cycles included in the transfer. In the engine now being considered this would require two timing numbers each of five binary digits and clearly this method of timing the transfer is not possible because only 7 digits are left. We propose to overcome this difficulty in this particular case by using 5 of the 7 digits as a timing number and the remaining 2 digits as a "characteristic" code which determines that the transfer shall be one of four predetermined species. For example, the four predetermined species of transfer may be the four transfers specified below. In these transfers the minor cycle in which the current instruction is set up is counted as minor cycle zero and the timing number is $n$.

(1) A transfer which starts in minor cycle one and continues for $(n+1)$ minor cycles, the next instruction being set up in minor cycle $(n+2)$.

(2) A transfer which starts in minor cycle one and continues for $(n+33)$ minor cycles, the next instruction being set up in minor cycle $(n+34)$.

(3) A transfer which takes place in minor cycle $(n+1)$ (that is to say one that lasts for only one minor cycle after a waiting time of $n$ minor cycles), the next instruction being set up in minor cycle $(n+2)$.

(4) A transfer which takes place in minor cycle $(n+1)$, the next instruction being set up in minor cycle 33.

It will be noticed that the timing number is not always used in the same way; thus in transfers 1 and 2 it determines the end and incidentally the duration of the transfer while in transfers 3 and 4 it determines the start of the transfer which lasts for only one minor cycle.

According to the present invention, therefore, a method of transferring information from one part of a digital computing engine to another part thereof, comprises the steps of setting up a transfer route in accordance with address signals and timing the transfer in accordance with a timing number and a characteristic code of at least two digits which determines that the transfer shall be one of a number of predetermined species of transfer.

In a preferred embodiment a single timing number $n$ is used in conjunction with a two digit characteristic code which determines that the transfer shall be one of the following species:

(1) A transfer which starts immediately following the setting up of a transfer route defined by the instruction word and continues for $(n+1)$ minor cycles.

(2) A transfer which starts immediately following the setting up of a transfer route defined by the instruction word and continues for a major cycle and $(n+1)$ minor cycles.

(3) A transfer which lasts for one minor cycle and commences after a wait of $n$ minor cycles after the setting up of a transfer route defined by the instruction word; and (4) A transfer which lasts for one minor cycle and commences after a wait of $n$ minor cycles after the setting up of a transfer route defined by the instruction word and in which the next instruction is set up at some predetermined time which is independent of the timing number, e. g. after a wait of one major cycle after the setting up of a transfer route defined by the instruction word.

In the case of species 1, 2 and 3 the next instruction may be set up at a predetermined time which does depend on the timing number and in the particular embodiment described below the next instruction is set up in the minor cycle following the end of the transfer. In all cases the setting up of the next instruction may be delayed by a discriminating trigger in accordance with well known methods of operating these machines.

The four species of transfer specified above will be found to be very suitable for practical computations and for convenience these species 1, 2, 3 and 4 will be hereinafter referred to as immediate, long, deferred and serial respectively.

A particular embodiment of the invention comprising a computing engine having the characteristics specified in the example set out above will now be described with reference to the accompanying drawings in which.

Figure 1:
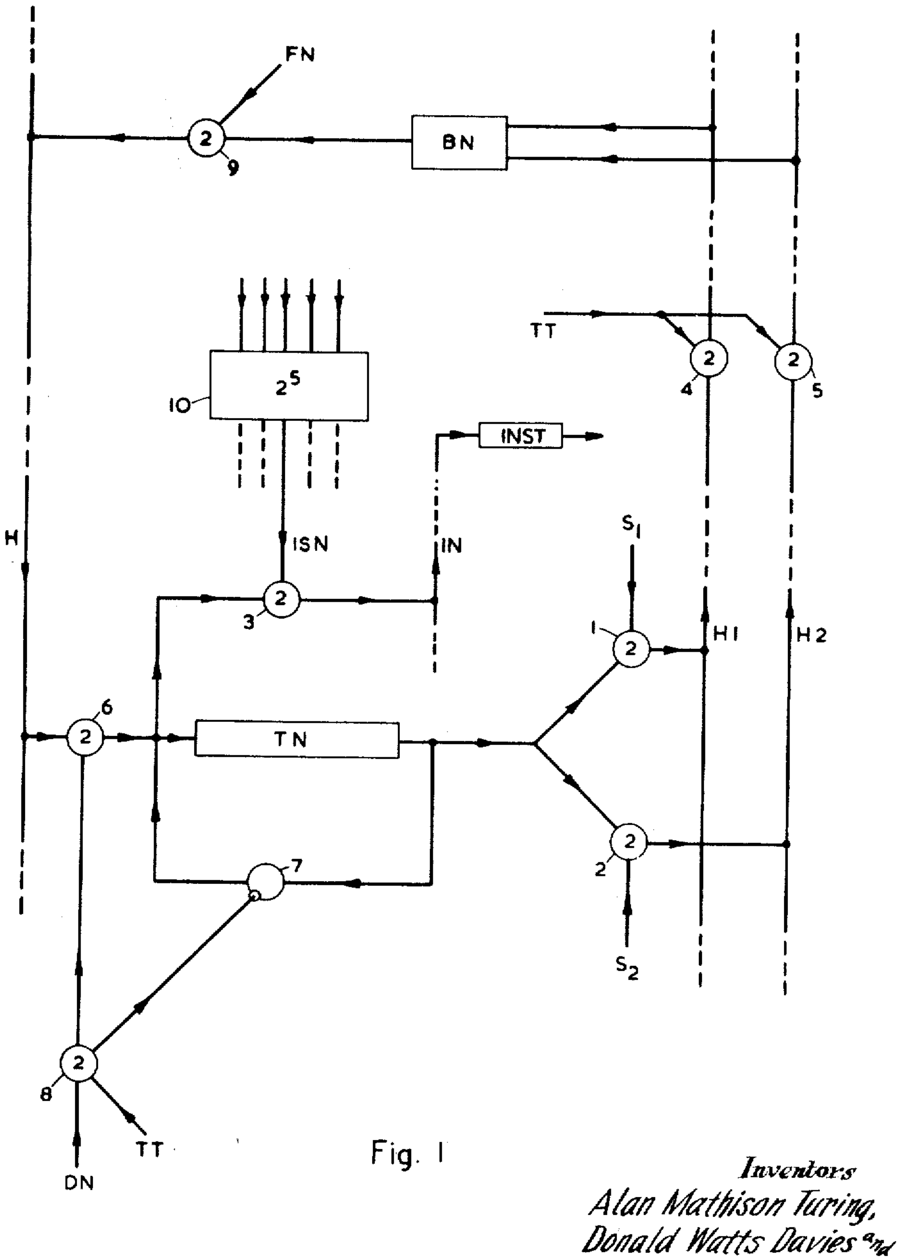
Figure 1 shows the circuit arrangement for routing transfers in a machine according to the invention.

In Figure 1 TN is a typical storage element and BN is a typical function box. For example TN may be a long delay line with its usual circulating path and BN may be an adder. Outputs may be taken from TN to common lines or buses H1, H2 and IN through gates 1, 2 and 3 respectively. The buses H1 and H2 (called highway 1 and highway 2) are common to all the sources in the engine and to all the inputs of the function boxes but include between the sources and the function boxes two gates 4 and 5 respectively. These gates are conditioned by a trigger TT in the timing circuit to be hereinafter described. The tank TN also comprises the usual destination gates 6 and 7 which are conditioned by destination pulses DN applied through a further gate 8 which is also conditioned by TT. The destination gate 6 is fed from a common line or bus H (called highway) which is common to all destination gates and also to output gates from the function boxes such as the gate 9 which is conditioned by a pulse FN.

Figure 3:
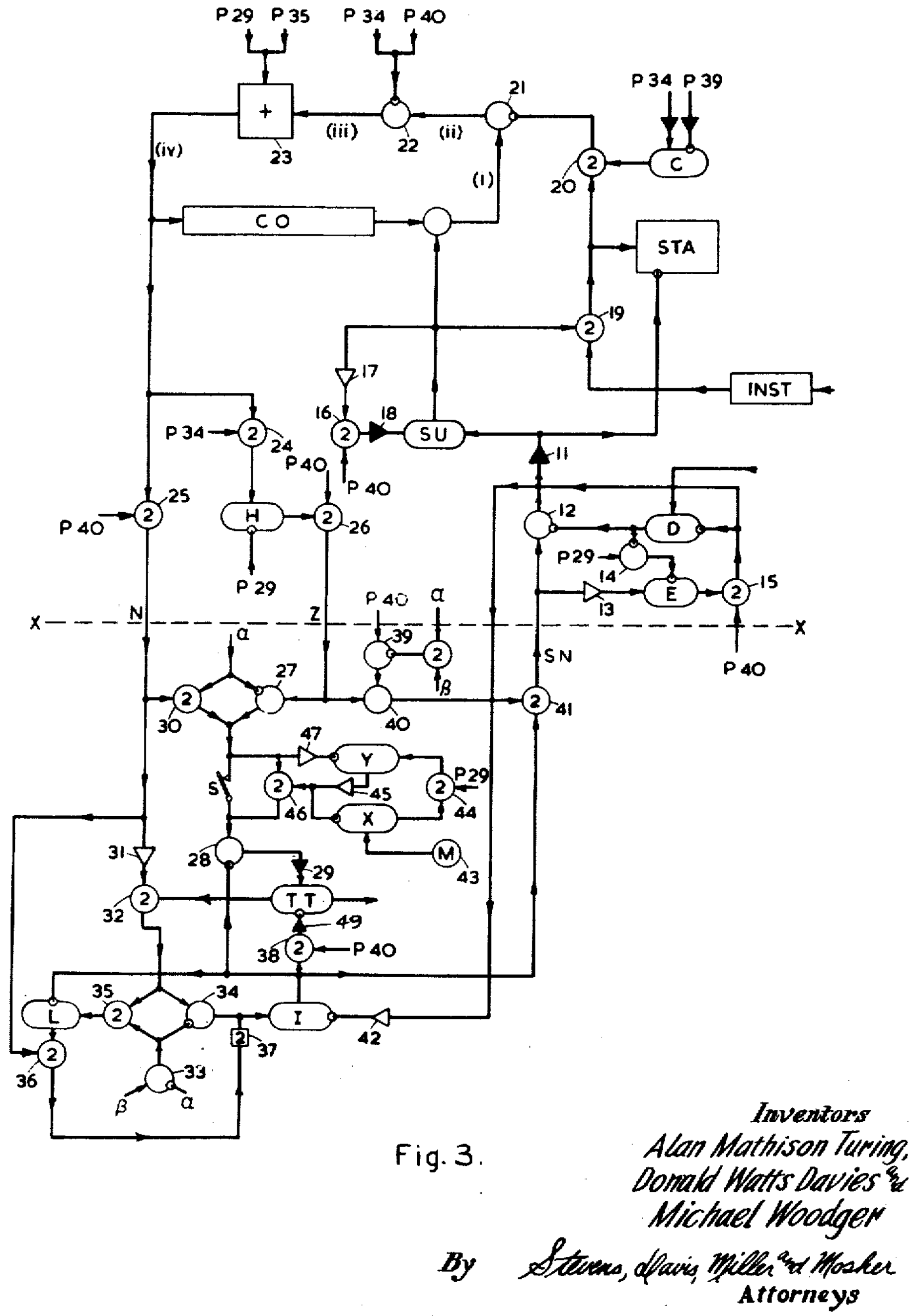
Figure 3 shows a circuit for timing transfers in a machine according to the invention and Figure 4 shows an alternative circuit for timing transfers in a machine according to the invention.

The bus IN is common to the 32 instruction sources and feeds a short tank INST which is arranged to contain the next instruction to be obeyed at the end of the transfer. When the timing circuit shown in Figure 3 is considered it will be seen that the instruction in the short tank INST at the end of the transfer flows into the control circuit to set up and time the next transfer. Consequently it is arranged in the progress of the computation that the instruction occurring in INST at the end of the transfer is the next instruction to be obeyed. There are two exceptions to this rule which will become clear when the control circuit has been studied. One relates to the effect of the discriminating trigger D in Figure 3 which when operated causes not the instruction in INST at the end of the transfer but the next following instruction to flow into the control unit. The other exception occurs when a serial transfer is made, in which case the next instruction is taken from INST one whole major cycle later. The gate 3 is conditioned by a pulse ISN.

The instruction word ordering the transfer will contain, as already explained, digits which will be decoded to open two source gates such as gates 1 and 2, a destination gate such as gate 6, a function box such as gate 9 and a next instruction gate such as gate 3. There will be 32 possible instruction sources and the five digits specifying the next instruction source in the instruction word will be staticised and applied to a tree 10 of order five, the 32 outputs of which will condition the gates such as gate 3 as indicated in the drawing.

Similarly three other trees each of order eight act as follows. The first source address digits P1—P8, are staticised and sent to the first source address tree (having 256 output lines) which decodes the digits and gives a signal on the output line which corresponds to the digits P1—P8; for example, if these digits are 10010100 (the least significant digit being in the left-hand position), corresponding to first source address No. 41, then the corresponding output line will be excited, and this will open the gate such as the gate 1 corresponding to storage tank such as TN No. 41. In exactly the same way the second source address digits P9—P16 are staticised and sent to a tree of order eight, one of the 256 outputs of which is used to open a second source gate such as the gate 2, and the destination address digits P17—P24 are staticised and sent to a tree of order eight, one of the 256 outputs of which is sent to a destination gate such as the gate 8, so that when the timing trigger TT, referred to above, is put on, a gate such as the gate 6 is opened and a gate such as the gate 7 closed and the word emerging from a function box such as the function box BN is allowed to flow into a destination tank such as the tank TN. In the same way the function digits P25—P28 are staticised and sent to a tree of order four, one of the sixteen outputs of which is used to open a function gate such as the gate 9 to allow the result of the operation which has taken place in the function box to flow through a destination gate such as the gate 6, opened as previously described, into a destination tank such as the tank TN. Staticisors and trees are well known in the art and are described in U. S. Patent No. 2,686,632, aforesaid. For the sake of clarity these trees are omitted from the drawing.

During the set-up minor cycle the source, destination, function box and next instruction gates are conditioned and the circuit is ready for a transfer to take place. However, owing to the presence of the gates 4, 5 and gates such as 8 the transfer does not take place until the trigger TT is put on and ends when the trigger TT goes off.

Figure 2:
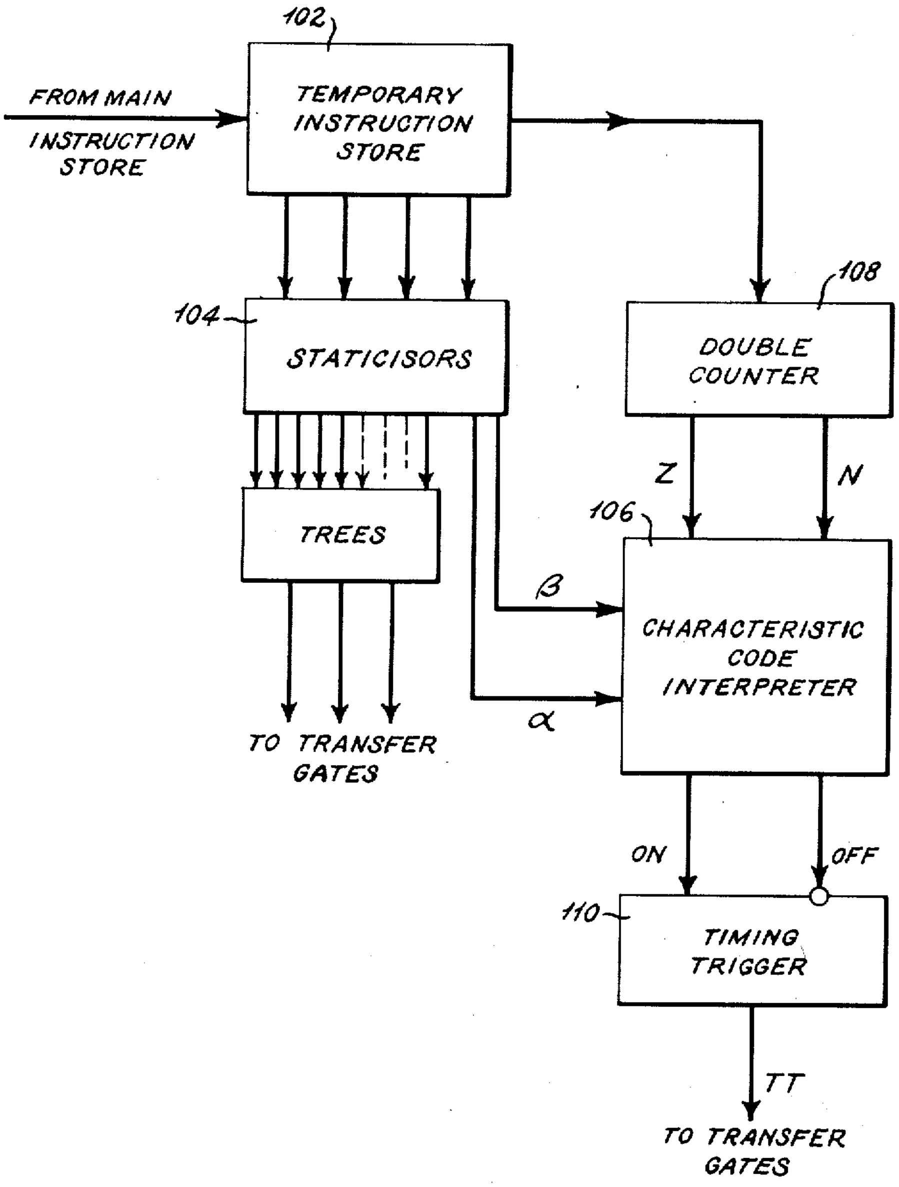
Figure 2 shows a block diagram with legends of the circuit arrangement for routing transfers in a machine according to the invention.

The present invention is shown diagrammatically in Figure 2. The instruction word to be obeyed flows into the temporary instruction store 102 which is preferably tapped at intermediate points so that parts of the instruction words may be staticised by the staticisor 104 before the whole word passes to the control circuit proper. A suitable staticisor is fully described in the U. S. Patent No. 2,686,632 aforesaid with reference to Figure 12 of the drawings, and in the text. The use of a tapped delay line is described below with reference to Figure 4 of the present specification.

Among the digits of the instruction word that are staticised are the digits of the characteristic code which are here referred to as $\alpha$ and $\beta$. These two staticised signals are passed to the characteristic code interpreter 106.

The output from the temporary store 102 passes to a double counting circuit 108 which gives an output pulse Z at the end of the set-up minor cycle and another output pulse N at the end of the *n*th minor cycle after the set-up minor cycle, where *n* is the value of the timing number. The counting circuit is arranged so that both Z and N occur again each major cycle later than their first appearance unless in the meanwhile the counting circuit has been reset.

Figure 4:
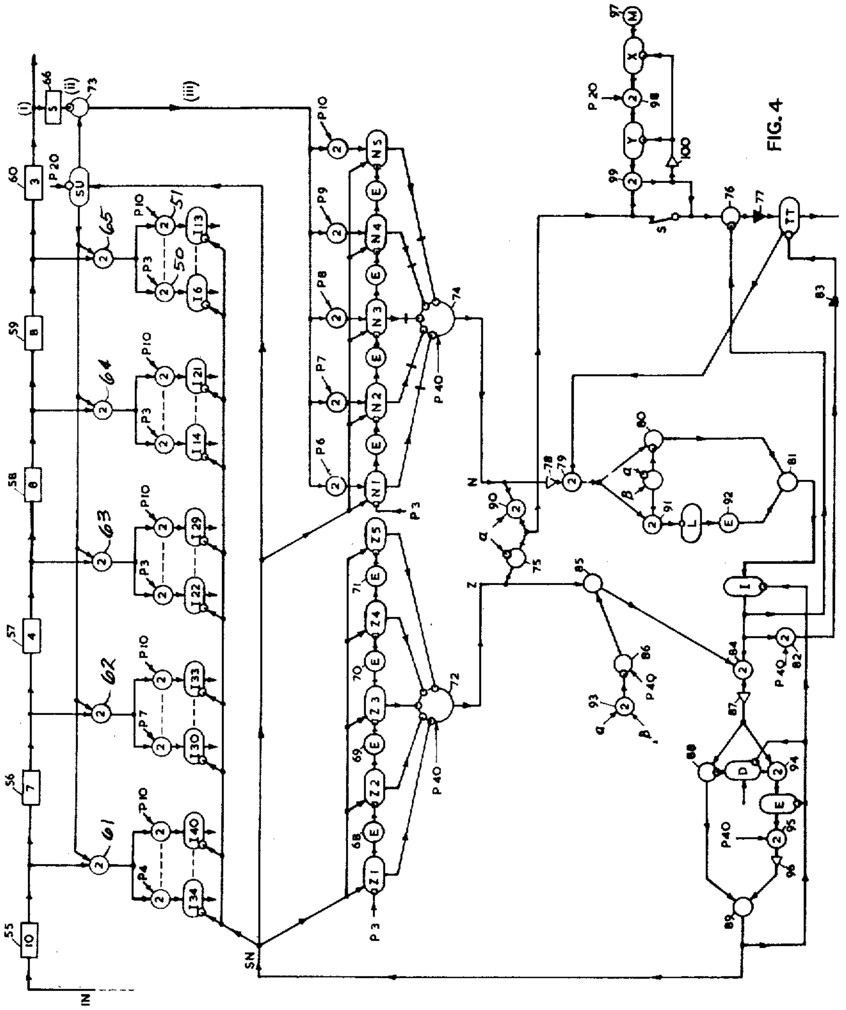

The pulses Z and N are arranged indirectly, and not necessarily respectively, to put on and off a timing trigger 110 which gives the signal TT in Figure 1 and is shown as TT in Figures 3 and 4. The way in which the pulses Z and N put the timing trigger 110 on and off is controlled by the characteristic code interpreter 106 in a way which is different for different permutations of values of the characteristic digits $\alpha$ and $\beta$ supplied to the interpreter 106, and the result is that the timing trigger goes on and off at the exact instants to give one of the four species of transfers described above corresponding to the values of $\alpha$ and $\beta$ at the time.

Two forms of the present invention are described below. That shown in Figure 3 employs a minor-cycle counter in which the negation of the timing number is set up to begin with, and in which one is added to this negation of the timing number every minor cycle until the result becomes $2^5$, when an N pulse occurs. A minor cycle counter is also employed in which the negation of zero, i. e. 11111, is set up, and in which one is added to this negation every minor cycle. Whenever the result becomes $2^5$, a Z pulse occurs. These N and Z pulses recur every major cycle. It will also become apparent that an N pulse occurs at the end of the *n*th minor cycle after the set-up minor cycle (*n* being the timing number), and a Z pulse occurs at the end of the set-up minor cycle. This embodiment also uses an un-tapped temporary instruction store. On the other hand the embodiment shown in Figure 4 uses a tapped temporary instruction store (see the chain of delays 55—66) and separate counters for the generation of the Z and N pulses. These counters each comprise a cascade of triggers counting in a scale of 32 (the number of minor cycles in a major cycle). The Z counter starts with a trigger setting of zero (which yields a Z pulse) and the N counter starts with a trigger setting corresponding to the negation of the timing number.

The two embodiments illustrated also differ in the means employed in the characteristic code interpreter to modify the action of the Z and N pulses on the timing trigger in accordance with the current values of $\alpha$ and $\beta$.

The way in which Figure 2 is related to the other figures, and the construction of the elements of Figure 2 are as follows. The temporary instruction store, 102, is the same as the store INST in Figures 1 and 3, and the store 55—60 in Figure 4. A suitable store would be the well-known acoustic delay line, and those skilled in the art are acquainted with many other useful devices for storing such elements.

The staticisors, 104, have been described above; in Figure 3 the element STA is a staticisor, and in Figure 4 the triggers I6 to I40 and their associated gates provide another such staticisor. A typical form of tree is described in, for instance, U. S. Patent No. 2,686,632 aforesaid, and a typical tree in the present invention is the tree 10 in Figure 1. Four other trees, as explained above, influence gates like the gate 1, the gate 2, the gate 8 and the gate 9 in Figure 1.

The characteristic code interpreter, 106, corresponds to that portion of Figure 3 below the line XX, with the exception of the timing trigger TT. In Figure 4, the characteristic code interpreter corresponds to the elements 75 to 100 with the triggers D, E, I, L, X, and Y, the switch S, and the connections therebetween.

The double counter, 108, corresponds to the elements 20 to 26 of Figure 3 together with triggers C and H, the delay line CO and their interconnections; it also corresponds to the triggers N1 to N5 and Z1 to Z5 together with their associated gates and interconnections in Figure 4.

The trigger 110 is represented by the trigger TT in both Figures 3 and 4. This trigger gives the TT pulse which opens gates 4 and 5 and gates such as the gate 8 in Figure 1.

The circuit shown in Figure 3 may conveniently be considered in two parts, the part above the line XX being mainly concerned with timing of the operation of the circuit in accordance with the timing number and the part below the line XX being mainly concerned with the interpretation of the two characteristic digits in the instruction word. At this stage it is necessary to consider the actual position of the digits in the instruction word. The first 33 digits may be used for indicating the first and second source, the destination, the function and the next instruction source. The characteristic digits will be P34 and P40 and the timing number will be the five digits P35 to P39. The characteristic digits at P34 and P40 will be referred to as $\alpha$ and $\beta$ respectively.

The digits of the instruction word are allocated as follows:

| | |
|---|---|
| First source: P1–P8 | 8 |
| Second source: P9–P16 | 8 |
| Destination: P17–P24 | 8 |
| Function: P25–P28 | 4 |
| Next instruction source: P29–P33 | 5 |
| Characteristic: P34 and P40 | 2 |
| Timing number: P35–P39 | 5 |
| Total | 40 |

The characteristic code for determining the species of transfer to be effected will be as follows:

| Species of Transfer | | $\alpha$ | $\beta$ | Duration of wait in minor cycles | Transfer in minor cycle(s) | Next set-up in minor cycle |
|---|---|---|---|---|---|---|
| No. | Name | | | | | |
| 1 | Immediate | 0 | 0 | 0 | 1 to $n+1$ | $n+2$ |
| 2 | Long | 0 | 1 | 0 | 1 to $n+33$ | $n+34$ |
| 3 | Deferred | 1 | 0 | $n$ | $n+1$ | $n+2$ |
| 4 | Serial | 1 | 1 | $n$ | $n+1$ | 33 |

In this table the current set up occurs in minor cycle 0. This programme will be slightly modified if the trigger D in Figure 3 is operated because then the next set-up will be in the minor cycle following the minor cycle set out in the table above. This will become clear when the operation of the circuit is explained. The trigger D is of course the discriminating trigger and its function is to modify the course of the computation when a certain criterion is reached. Its use is well-known to those skilled in preparing programmes for computing engines and, therefore, need not be set out at length here.

It is convenient to consider the circuit in Figure 3 by assuming first that the gate 41 produces a pulse, called SN and indicated as such in the drawing at P40. That this is so, will be seen when the circuit has been fully explained.

Normally SN will stimulte the trigger SU through the half delay 11 at P40½. If, however, D has been stimulated during the previous transfer SN is stopped at the gate 12. The trigger E is set by SN at P1 through the unit delay 13 and since D has been stimulated is not reset at P29 owing to the inhibited gate 14. Thus the next P40 applied to the gate 15 sets the trigger SU and incidentally puts D off. The next P29 puts E off, thus, as stated above, stimulating D has the effect of delaying the putting on of the trigger SU by one minor cycle. It will be explained below that the trigger SU is on for one minor cycle during which the incoming signal is set up. The consequence of stimulating the trigger D therefore is to delay the set-up of the next instruction by one minor cycle.

When SU is put on it conditions the gate 16 through the unit delay 17 and is thus put off in the next P40½ by P40 applied through the gate 16 and the half unit delay 18. During the minor cycle in which SU is on the gate 19 is conditioned and the instruction in the tank INST (which is of course the tank INST shown in Figure 1), flows to the staticiser STA which decodes the two source codes, the destination code, the function code the next instruction source and conditions the corresponding gates such as those shown at 1, 2, 8, 9 and 3 in Figure 1.

Staticisors are very well known in the art, and the operational details of a suitable staticisor may be found in U. S. Patent No. 2,686,632 aforesaid.

STA has, of course, been cleared by the same pulse that puts the trigger SU on. In addition STA staticises the $\alpha$ and $\beta$ digits of the characteristic code. The instruction word also flows to a gate 20 which is conditioned by a trigger C which is on from P34½ to P39½. Thus only the timing number (i. e. digits P35 to P39) passes the gate 20. This timing number is negated at the gate 21 because SU is on during the set-up cycle. That is to say, the digits of the timing number are replaced by their complements, so that if the timing number $n$ is 01011, the output of gate 21 is 10100. For if a timing number digit at a certain time is one, then the gate 21 is inhibited by it, so that the gate 21 gives a zero output. If, on the other hand, the timing number digit is zero, then the gate 21 is open and the output from the trigger SU is allowed to get through, giving a "one" output from the gate 21.

Since the only digits passing through the gate 20 are at P35 to P39 time, the gate 21 is inhibited only at this time, so that the signal appearing at the gate 22 during the set-up minor cycle consists of 34 ones, followed by the negated timing number, followed by a one. The gate 22 is inhibited at P34 and P40 times, so that its output will be the same as its input except during P34 and P40 times when its output will always be zero. This output appears at the binary adder 23 where digits are added in at P29 and P35 times. A suitable adder is described in U. S. Patent No. 2,686,632 aforesaid. The output of the adder 23 is sent to the counting tank CO. The digits appearing at the points (i), (ii), (iii), and (iv) of the circuit during the P29 to P40 times of the set-up minor cycle are, therefore, as follows:

| | |
|---|---|
| (i) All ones | 111111111111 |
| (ii) P29 to P34—still ones<br>P35 to P39—negated timing number 31—$n$<br>P40—still one | e. g. 111111101001 |
| (iii) As (ii), with P34 and P40 made zero.<br>P29 to P34 gives 111110, which is 31 in binary notation, while P35 to P40 gives 101000, which is the negated timing number 31—$n$ | 111110101000 |
| (iv) A P29 and a P35 are added to the number at (iii)<br>P29 to P34 gives 000001, which represents 32,<br>while P35 to P40 gives 011000,<br>which represents 32—$n$ | (iii) 111110101000<br>P29 & P35+100000100000<br>(iv) 000001011000 |

The two numbers represented by P29 to P34 and P35 to P40 are very important, for each increases by one every minor cycle, until it becomes 32, when a "one" digit appears in the P34 or P40 position, as the case may be. This digit is gated out at one of the gates 24 or 25. In the next minor cycle the digit is prevented from repeating this by the inhibiting gate 22. The P34 pulse puts on a trigger H which allows the next P40 through the gate 26 and is then put off in the following P29. Thus the upper part of the circuit in Figure 3 generates from the timing number part of the instruction word two pulses occurring at N and Z which pass to the lower part of the circuit. These pulses N and Z are P40 pulses and are repeated at each major cycle until the next set-up occurs.

It will be seen, by considering the signal at the point (iv), that the first Z pulse occurs at the end of the set-up minor cycle so that Z pulses occur in minor cycles 0, 32, 64 etc. until the next set-up. The N pulses are $n$ minor cycles behind the Z pulses. Of course, when the timing number is zero the pulses N and Z coincide in minor cycles 0, 32, 64, etc.

The lower part of the circuit in Figure 3 which is concerned with the interpretation of the characteristic code pulses $\alpha$ and $\beta$ may now be considered. The output from this circuit consists of a gate pulse from the trigger TT which conditions the gates 4 and 5 and the gate such as 8 shown in Fig. 1 for the purpose of timing the transfer, and P40 pulses at SN to operate the upper part of the circuit in Fig. 3 as already explained. It will be assumed at first that the switch S is closed so that the part of the circuit across this switch may be neglected and further that at the beginning of the set-up minor cycle the triggers TT, I and L are off. When the circuit has been explained it will be appreciated that this last condition automatically obtains. The trigger D will also be assumed off. If it has been put on its effect will be as described above.

The effect of all the possible combinations of the characteristic code may be considered in order.

Consider first an "immediate" transfer in which $\alpha=0$ and $\beta=0$. The Z pulse at the end of minor cycle 0 puts the trigger TT on at P40½ in this minor cycle through the gates 27, 28 the switch S and the half delay 29. The next N pulse (which can coincide with a Z pulse) is stopped at the gate 30 but passes via the unit delay 31 and the gates 32 and 34 to put the trigger I on at the beginning of minor cycle ($n+1$) and a P40 via the gate 38 and the half unit delay 49 puts the trigger TT off at the end of this minor cycle. The trigger I also gates a P40 (coming via gates 39 and 40) through the gate 41 and this pulse delayed at 11 is the pulse which puts SU on for the next set-up. The P40 going through the gate 41 also puts the trigger I off via the delay 42.

Consider now a long transfer in which $\alpha=0$ and $\beta=1$. In this case the first Z pulse puts the trigger TT on at P40½ in the set-up minor cycle and the first N pulse passing through the unit delay 31 and the gates 32 and 35 puts the trigger L on the second N pulse (occurring a major cycle later) is gated by L at the gate 36 to put the trigger I on via the 2 unit delay 37. Thus I goes on and puts L off and also allows the next P40 via the gate 38 and the delay 49 to put TT off. In addition as before I gates a P40 through the gate 41 to put itself off and to put SU on again.

Consider now a deferred transfer in which $\alpha=1$ and $\beta=0$. The Z pulse is stopped at the gate 27 but the first N pulse delayed half a unit at 29 puts TT on, via the gates 30 and 28, at P40½ in minor cycle $n$. Half a unit later (owing to the unit delay 31) it puts the trigger I on through the gates 32 and 34. When I goes on it has the same effect as before.

Consider finally a serial transfer in which $\alpha=1$ and $\beta=1$. The Z pulses are stopped at 27 the first N pulse puts TT on at P40½ in minor cycle $n$ and half a unit later puts the trigger I on as in a deferred transfer.

However, in a serial transfer the only P40's incident at the gate 41 are Z pulses because the other P40's are stopped at the gate 39 since both $\alpha$ and $\beta$ are ones. Thus the next Z pulses passes to SN to start a new set-up in minor cycle 33.

In the case of a long transfer the trigger L is set too late to gate the first N pulse through the gate 36 and the two unit delay 37 to set the trigger I but it does so at the next N pulse 32 minor cycles later. At this point a timing difficulty may be mentioned. The switch comprising the gates 33, 34 and 35 is operated by $\beta=1$ and $\alpha=0$ is not ready to operate until $\beta$ has been staticised in P40 of the set-up minor cycle and since the N pulse may arrive at the same time (this occurs when the timing number $n$ is zero), the unit delay 31 may have to be slightly increased. The pulse gated by L to set I must be delayed by a greater amount in order that L may be reset by I after the second N pulse has attempted to set it. For this purpose the delay 37 may be a two unit delay.

In the case of a serial transfer in which $n$ is equal to 31 I is put on in minor cycle 32 and the Z pulse arrives at the end of this minor cycle giving an immediate set-up. Thus in this case the transfer is like a deferred transfer. When the set-up has been started I is put off via the unit delay 42.

It is convenient at this stage to summarise the effects produced by different combinations of $\alpha$ and $\beta$.

(1) An immediate transfer in which $\alpha=0$ and $\beta=0$. A Z pulse sets TT at P40½ in the set-up cycle. TT remains on for $(n+1)$ minor cycles, because an N pulse delayed one unit sets I and the next P40½ puts TT off. All P40's are incident at gate 41 hence the next P40 after the N pulse is incident at SN to accept the next instruction.

(2) A long transfer in which $\alpha=0$ and $\beta=1$. A Z pulse sets TT at P40½ in the set-up cycle. TT remains on for $(n+33)$ minor cycles because an N pulse delayed one unit sets L and the next N pulse (one major cycle later) delayed two units sets I which resets L and causes the next P40½ to reset TT and to be incident at SN to accept the next instruction.

(3) A deferred transfer in which $\alpha=1$ and $\beta=0$. An N pulse delayed a half unit puts TT on at P40½ in minor cycle $n$ and half a unit later puts I on so that the next P40½ puts TT off and becomes incident at SN to accept the next instruction.

(4) A serial transfer in which $\alpha=1$ and $\beta=1$. An N pulse delayed half a unit puts TT on at P40½ in minor cycle $n$ and half a unit later puts I on so that the next P40½ puts TT off. The only P40's incident at the gate 41 are Z pulses and the next Z pulse is incident at SN to accept the next instruction in minor cycle 33.

It will be seen that the purpose of the trigger I is to put the trigger TT off and, therefore, I is arranged to be on when TT is liable to be stimulated before the next set-up should occur. For example in the case of a long or immediate transfer in which $n=31$, a Z pulse arrives in minor cycle 32 in which TT is to be put off. This is prevented from reaching TT by the gate 28 which is inhibited by I. In the case of a serial transfer in which $n=0$, an N pulse arriving at the same time (minor cycle 32) is stopped by the same gate 28. The trigger I cannot be seset by SN otherwise gate 28 would allow an unwanted pulse through in some cases (e. g. when D has been stimulated and the set-up delayed). The trigger I must be reset by the pulse which stimulates SN.

The circuit shown in Figure 3 is also adapted for push button operation in which the starting of transfers is interrupted manually. This is done by the circuit across the switch S which for push button operation is open. When S is opened the setting of TT by an N or Z pulse is stopped, since L and TT are off the N pulses do nothing and since I is off the Z pulses do nothing. An impulse from a manual press button source 43 sets the trigger X at an arbitrary time. X conditions the gate 44 and allows the trigger Y to be set by the next P29. Y resets X and conditions the gate 46 through the unit delay 45. The next Z or N pulse thus passes through the gate 46 to set TT, and also to reset Y through the unit delay 47. This occurs an integral number of major cycles after TT would have been set in normal operation because N and Z pulses occur once per major cycle. From this point the operation up to the next setting of TT is the same in push button operation as in normal operation. The separate operations of a table may be carried out one by one with the push button and the hiatus of an integral number of major cycles between successive operations of the press button will not disturb the calculation, provided freely running devices (e. g. multipliers or dividers) are designed so that their results may be retained and passed back to the main storage after an integral number of major cycles.

An alternative embodiment of the invention is illustrated in Figure 4. In this case the short tank INST is replaced by a series of delay units 55, 56, 57, 58, 59 and 60 having delay times of 10, 7, 4, 8, 8 and 3 units respectively.

As in the embodiment described above, when a setup minor cycle starts the instruction contained in the delay units 55—60 is the next instruction to be obeyed. When this arrangement is used the forty digits of the instruction word are allocated as follows:

| | |
|---|---|
| Timing number: P1–P5 | 5 |
| First source: P6–P13 | 8 |
| Second source: P14–P21 | 8 |
| Destination: P22–P29 | 8 |
| Function: P30–P33 | 4 |
| Next instruction source and characteristic: P34–P40 | 7 |
| | 40 |

Since the delay units 55—60 are in a way equivalent to the short tank INST of Figure 3, the various parts of the instruction word are, so to speak, "prematurely extracted" from the short tank before they reach the end, and for this purpose the gates 61, 62, 63, 64 and 65 are arranged at the junctions of the delay units. These gates are conditioned by the trigger SU and when the trigger SU is on, outputs from the gates 61, 62, 63, 64, and 65 are staticised in a manner which will now be particularly described.

When a transfer is completed, it is arranged that the instruction word contained in the dalay units 55—60 is the next instruction to be obeyed. Consequently at the beginning of the next minor cycle (i. e. the current set-up minor cycle), the timing number starts to issue at the point (i). Hence at P3 time of this set-up minor cycle, the first digit of the first source number will appear at the output of the delay line 59 and subsequent digits at the digit periods P4—P10. If therefore the trigger SU is on over these periods, the first source number will be staticised on the triggers 16—113 via gates such as the gates 50 and 51 conditioned by pulses P3—P10. In a similar way it will be seen that the second source address is staticised on the triggers I14—I21, the destination on the trigger I22—I29, the functions on the triggers I30—I33 and the next instruction source and the characteristic digits $\alpha$ and $\beta$ on the triggers 134—140. It will also be seen that all these numbers are staticised in the set-up minor cycle between P3 and P10 times inclusive.

The delay units 55 to 60 may be artificial lines and the pulses of the instruction word may be badly distorted by these networks. For this reason an and gate conditioned by clock pulses of good shape may be included in the circuit immediately after each delay unit.

A set-up is initiated in the circuit shown in Figure 4 by a pulse occurring at P1 time in the set-up minor cycle at the point SN. This puts on the trigger SU, which is then put off at the next P20.

The pulse at SN also puts on the five triggers Z1–Z5 which are connected in series with end elements 68–71. End elements are fully described in U. S. Patent No. 2,686,632 aforesaid, with reference to Figures 7 and 9 thereof. These end elements feed change-over connections of the triggers, so that, the trigger Z1 when it goes off operates the changeover connection to the trigger Z2 and changes its state and similarly with the other triggers. However when the trigger Z1 goes on it has no effect on the trigger Z2, and the result of this arrangement is that P3 applied to the changeover connection of the trigger Z1 puts all the triggers Z1–Z5 off in the set-up minor cycle and consequently in this minor cycle P40 applied to the gate 72 appears at the point Z. As in the embodiment described above, this Z pulse will be repeated one major cycle later and so on periodically until another pulse occurs at SN. This will be apparent from the following considerations: Let the status of the triggers Z1–Z5 be represented by 1 or 0 according as the trigger is on or off, then the states of the triggers at the end of minor cycle zero (the set-up minor cycle) and subsequent minor cycles will be as shown in the following scheme:

| End of Minor Cycle | State of Triggers Z1–Z5 |
|---|---|
| 0 | 0 0 0 0 0 |
| 1 | 1 0 0 0 0 |
| 2 | 0 1 0 0 0 |
| 3 | 1 1 0 0 0 |
| 4 | 0 0 1 0 0 |
| 5 | 1 0 1 0 0 |
| 30 | 0 1 1 1 1 |
| 31 | 1 1 1 1 1 |
| 32 | 0 0 0 0 0 |
| 33 | 1 0 0 0 0 |

This scheme shows that the gate 72 is opened only at the end of minor cycles 0, 32, 64 and so on.

The pulse at SN also puts the 5 triggers N1–N5 on at P1 in the set-up minor cycle. The triggers N1–N5 are connected in series with end elements in the same way as the triggers Z1–Z5, and P3 in the set-up minor cycle puts them all off in precisely the same way as for the triggers Z1–Z5. The timing number *n* begins to appear at the point (i) at P1 in the set-up minor cycle and consequently at the point (ii) at P6 in the set-up minor cycle. The timing number *n* is negated at the gate 73 (because SU is on) in exactly the same way as the timing number is negated (that is to say, each binary digit of the timing number is replaced by its complement) at the gate 21 in Figure 3 and appears at the point (iii) as $(31-n)$ and sets up the triggers N1–N5 in accordance with the negated timing number. In subsequent minor cycles P3 changes the state of the trigger N1 and it will be seen that at the end of minor cycle *n* all the triggers N1–N5 are on, and consequently their negated outputs applied to the gate 74 allow a P40 pulse to appear at the point N. This pulse also will be repeated one major cycle later and so on periodically.

This part of the circuit may be more readily understood if a concrete example is considered. Suppose therefore that the timing number is eleven, that is to say, in binary notation 11010 (the digit of least significance is on the left). This number is negated and appears at (iv) as 00101. The states of triggers N1–N5 at the end of the set-up minor cycle and subsequent minor cycles may, therefore, be represented by the following scheme:

| End of Minor Cycle | State of Triggers N1–N5 | Explanation |
|---|---|---|
| 0 | 00101 | |
| 1 | 10101 | P3 changes the state of N1, putting it on. |
| 2 | 01101 | P3 changes the state of N1, putting it off and causing its associated end element to give a pulse, changing the state of N2 and thus putting N2 on. |
| 3 | 11101 | P3 changes the state of N1, putting it on. |
| 4 | 00011 | P3 changes the state of N1, putting it off and causing its associated end element to give a pulse changing the state of N2 and thus putting N2 off. This causes the end element associated with N2 to emit a pulse which in its turn changes the state of N3, putting N3 off. The end element associated with N3 emits a pulse as a consequence, thus changing the state of N4, which is thereby put on. |
| 5 | 10011 | The same as end of minor cycle 1. |
| 6 | 01011 | The same as end of minor cycle 2. |
| 7 | 11011 | The same as end of minor cycle 1. |
| 8 | 00111 | P3 changes the state of N1, putting it off and causing its associated end element to give a pulse changing the state of N2 and thus putting N2 off, which causes the end element associated with N2 to emit a pulse which in its turn changes the state of N3, putting N3 on. |
| 9 | 10111 | The same as end of minor cycle 1. |
| 10 | 01111 | The same as end of minor cycle 2. |
| 11 | 11111 | The same as end of minor cycle 1. |
| 12 | 00000 | As above, P3 puts N1 off, which puts N2 off, which puts N3 off, which puts N4 off, which puts N5 off. |
| 13 | 10000 | The same as end of minor cycle 2. |

It will be seen that the triggers behave exactly like the binary digits of a five-digit number increasing by one every minor cycle, the least significant digit being in the left-hand position. Thus a given state of the trigger N1–N5 will be exactly repeated 32 minor cycles later. All the triggers are on at the end of minor cycle 11, corresponding with the timing number 11. So this state of affairs will be repeated at the end of minor cycles 43, 75, and so on cyclically.

It will be seen that the staticising of the address numbers in the instruction word and the setting up of the triggers N1—N5 by the timing number is completed at P10 in the set-up minor cycle. Consequently SU is put off some time later say at P20, as indicated in the drawing.

The operation of the rest of the circuit in Fig. 4 will now be described for various combinations of the characteristic code digits. It will be seen that in the course of a transfer the triggers I, L and TT will have been put off. We therefore start the description by assuming that these triggers are all off. In addition it will be assumed, for the time being, that the switch S is closed so that the circuit across this switch has no effect and that the triggers E and D are also off.

Consider first an "immediate" transfer in which $\alpha=0$ and $\beta=0$. In this case the first Z pulse is passed by the gates 75 and 76 and the half unit delay 77 to put the trigger TT on at P40½. The trigger I is off, so the gate 76 is open. The first N pulse delayed one by the unit delay 78 is gated by TT through the gate 79 and passes through the gate 80 and the buffer 81 to put the trigger I on at P1 in minor cycle $(n+1)$. The trigger I gates the next P40 at gate 82 which puts TT off at P.40½ through the half unit delay 83. The trigger I also gates a P40 pulse at the gate 84 coming from the buffer 85 and the gate 86. This pulse passes through the unit delay 87, the gate 88, the buffer 89 and appears at SN to initiate the next set-up. This pulse also puts the trigger I off.

Consider now along transfer in which $\alpha=0$ and $\beta=1$. In this case the first Z pulse puts TT on at P.40½ in the setup minor cycle and the first N pulse passing through the unit delay 78 and the gates 79 and 91 puts the trigger L on at a changeover connection. The trigger L feeds an end element 92 and has no effect on the circuit when it comes on. The second Z pulse does nothing because the trigger TT is already on and the gate 84 is closed because I has not been put on. The second N pulse applied to the changeover connection of the trigger L through the same channel as before puts the trigger L off. This yields a pulse from the end element 92 which passes via the buffer 81 to put the trigger I on at P1 in minor cycle $(n+33)$. TT is then put off at P.40½ in this minor cycle and a pulse appears at P1 in the next minor cycle at SN. This also puts the trigger I off.

Consider now a deferred transfer in which $\alpha=1$ and $\beta=0$. In this case the first Z pulse does nothing because the trigger I is off. The first N pulse passes through the gates 90, 76 and the half unit delay 77 and puts TT on at P.40½ in minor cycle $n$. The first N pulse also puts the trigger I on because having passed through the unit delay 78 it finds the gate 79 conditioned by TT (which has been put on half a digit period earlier) and passes via the gate 80 and the buffer 81 to put I on at P1 in minor cycle $(n+1)$. The trigger I as before then puts TT off at the end of minor cycle $(n+1)$ and provides a pulse at SN for the next set-up; this pulse also puts the trigger I off.

Finally consider a serial transfer in which $\alpha=1$ and $\beta=1$. The first Z pulse does nothing. The first N pulse puts on TT at P.40½ in minor cycle $n$ and, via the unit delay 78, the gates 79 and 80, and the buffer 81, puts the trigger I on at P1 in minor cycle $(n+1)$. When I goes on TT is put off at P.40½ in the same minor cycle. In this transfer the P40 applied to gate 86 is inhibited because $\alpha$ and $\beta$ applied to the gate 93 are both ones and consequently a pulse is not available at SN until the next Z pulse arrives via the buffer 85. This is gated by I at the gate 84, passes through the unit delay 87 and provides a pulse at P1 in minor cycle 33 at SN. This pulse, as before, puts I off.

The effect of this part of the circuit may be summarised as follows:

1. In an immediate transfer TT is put on at P40½ in the setup minor cycle and remains on for $n+1$ minor cycles. When TT goes off a pulse occurs at SN to initiate the next setup immediately.
2. In a long transfer TT is put on at P.40½ in the setup minor cycle and remains on until the end of minor cycle $n+33$. When TT goes off the next setup is initiated as before.
3. In a deferred transfer TT is put on at P.40½ in minor cycle $n$ and remains on for one minor cycle only and when TT goes off a pulse appears at SN to initiate the next setup immediately.
4. In a serial transfer TT is put on at P.40½ in minor cycle $n$ and goes off at the end of the next minor cycle. A pulse appears at SN at P1 in minor cycle 33.

It will thus be seen that, as in the previously described embodiment, the various combinations of $\alpha$ and $\beta$ do in fact produce the species of transfer set out in the table set out above.

The effect of the trigger D may now be considered. As in the previous embodiment D is one of the addresses to which numbers may be sent and if during a transfer D has been put on it effects the next transfer as follows: the pulse emerging from the unit delay 87 at P1 cannot pass the gate 88 and the buffer 89 to form a pulse at SN which initiates the next setup. Instead the pulse passes through the gate 94 and puts the trigger E on. This trigger gates the next P40 at the gate 95 which delayed one by the unit delay 96, passes through the buffer 89 and appears at SN as a P1 pulse to initiate the next setup. It also puts off the triggers E, D and I, thus the effect of putting the trigger D on in one transfer is to delay by one minor cycle the setting up of the instruction following this transfer.

If the switch S is open TT cannot be put on by a Z or N pulse unless the circuit across the switch S has been operated. This circuit operates as follows: a manual control 97 puts the trigger X on and this gates the next P20 at the gate 98 which puts the trigger Y on. Y remains on until a Z or N pulse is gated past the switch S by the gate 99 to put the trigger TT on. This pulse, delayed one at the unit delay 100, then puts the triggers Z and Y off. Thus the operation of the trigger TT and hence of the machine as a whole may be suspended by opening the switch S. The operation is then recommenced an integral number of major cycles later by the manual control 97 as in the previously described embodiment.

As in the other embodiment, when the trigger I goes on the next P40 puts the trigger TT off. But here again I also prevents TT being put on at the wrong times. For example, in the case of a long or immediate transfer in which $N=31$ a Z pulse arrives in minor cycle 32 in which TT is to be put off but this Z pulse is stopped at the gate 76 because I is on.

Similarly, in the case of a serial transfer in which $n=0$, TT is put on at P40½ in minor cycle O and I at P1 in minor cycle 1 so that TT goes off at P40½ in minor cycle 1, the next N pulse arrives at P40 in minor cycle 32 and tries to put TT on again but is stopped at gate 76 because I is still on. Other critical cases occur when the trigger D has been tripped but in all cases it will be found that the circuit operates as required because when D is tripped it delays, not only the next setup but also the switching off of the trigger I, so that the gate 76 remains closed at the critical times.

What we claim is:

1. In an electronic digital computing engine employing stores in which stored words are incident at the output terminals of the stores sequentially, means for transferring stored information from one part of the engine to another part thereof and comprising means for providing a transfer route in accordance with address signals in an instruction word, means for timing the transfer in accordance with a single timing number $n$ in the instruction word and a two digit characteristic code in the instruction word so the transfer is timed as one of the following species according to the current values of the digits of the characteristic code: (*a*) a transfer which starts immediately after the setting up of a transfer route defined by the instruction word and continues for $(n+1)$ minor cycles, (*b*) a transfer which starts immediately after the setting up of a transfer route defined by the instruction word and continues for one major cycle and $(n+1)$ minor cycles, (*c*) a transfer which lasts for one minor cycle and commences after a wait of $n$ minor cycles after the setting up of a transfer route defined by the instruction word, and (*d*) a transfer which lasts for one minor cycle and commences after a wait of $n$ minor cycles after the setting up of a transfer route defined by the instruction word and in which the next instruction to be obeyed is set up at some predetermined time which is independent of the timing number, e. g., after a wait of one major cycle after the setting up of a transfer route defined by the instruction word.

2. Apparatus as defined by claim 1 wherein means are further provided whereby the next instruction to be obeyed after transfer of the species (*a*), (*b*) and (*c*) set up in the minor cycle immediately following the completion of the transfer.

3. In an electronic digital computing engine employing stores in which stored words are incident at the output terminals of the stores sequentially, a circuit controlling the transfer of information from one part of the engine to another part thereof and operated by a serial instruction word containing a single timing number and a characteristic code of at least two digits, the said circuit comprising a counting circuit arranged to deliver a first series of pulses starting at the end of the set-up minor cycle and repeating every major cycle, a counting circuit arranged to deliver a second series of pulses starting at the end of the $n$th minor cycle after the set-up minor cycle and repeating every major cycle, gates conditioned by one digit of the characteristic code to act as a two way switch and arranged to put on a transfer timing trigger by a pulse of the first or second series depending on the value of one digit of the characteristic code, a second trigger arranged to put the timing trigger off at the end of the minor cycle in which the second trigger goes on and to gate a third series of pulses arranged to initiate the next set-up and also to put the second trigger off, and means for putting the second trigger on by the first or second pulse of the second series according to the value of the digits of the characteristic code.

4. An engine according to claim 3 and in which the third series of pulses is the output from an or gate fed continuously with the first series of pulses and with pulses occurring at the end of each minor cycle except when two digits in the characteristic code have a predetermined permutation of values.

5. An engine according to claim 3 and comprising a manual switch in the lead feeding the first or second series of pulses to the timing trigger and arranged to stop, when operated, the flow of these pulses and hence the operation of the engine and a gate across the manual switch and arranged to be conditioned by a synchronised manual control to restart the operation of the engine an integral number of major cycles after it has been stopped.

References Cited in the file of this patent

UNITED STATES PATENTS 2,604,262 Phelps et al. ------------ July 22, 1952

OTHER REFERENCES

"A Functional Description of the Edvac," Moore School of E. E., University of Pa., Philadelphia, Pa., November 1, 1949; volume I, pages 1-1 to 1-17; volume II, Dwg. 104–iOLD–6.

"Calculating Instruments and Machines," D. R. Hartree, University of Illinois Press, Urbana, Illinois, 1949; pages 99 and 106–109.